(12) United States Patent
Mok et al.

(10) Patent No.: US 8,976,816 B1
(45) Date of Patent: Mar. 10, 2015

(54) SELF-SYNCHRONOUS SCRAMBLER/DESCRAMBLER AND METHOD FOR OPERATING SAME

(71) Applicant: PMC-Sierra US, Inc., Sunnyvale, CA (US)

(72) Inventors: Winston Ki-Cheong Mok, Vancouver (CA); Richard Arthur John Steedman, Winchester (GB)

(73) Assignee: PMC-Sierra US, Inc., Sunnyvale, CA (US)

( * ) Notice: Subject to any disclaimer, the term of this patent is extended or adjusted under 35 U.S.C. 154(b) by 102 days.

(21) Appl. No.: 13/842,175

(22) Filed: Mar. 15, 2013

Related U.S. Application Data

(60) Provisional application No. 61/695,849, filed on Aug. 31, 2012.

(51) Int. Cl.
*H04J 3/06* (2006.01)
*H04L 29/06* (2006.01)

(52) U.S. Cl.
CPC ............... *H04L 69/22* (2013.01); *H04J 3/0605* (2013.01)
USPC ........................................................ 370/512

(58) Field of Classification Search
USPC ......... 370/470, 472, 476, 479, 503, 506, 507, 370/509, 510, 511, 512, 513, 514; 341/143; 380/268, 37, 42, 259, 260, 261, 265; 714/701, 758
See application file for complete search history.

(56) References Cited

U.S. PATENT DOCUMENTS

| | | | |
|---|---|---|---|
| 4,729,119 A | * | 3/1988 | Dennison et al. ............... 365/63 |
| 4,914,622 A | * | 4/1990 | Sfarti et al. .................... 345/501 |
| 6,961,348 B2 | | 11/2005 | Yu |
| 7,738,601 B2 | | 6/2010 | Thaler |

FOREIGN PATENT DOCUMENTS

EP 0232043 A2 * 8/1987 .............. H04L 25/49

OTHER PUBLICATIONS

International Telecommunication Union, ITU-T G.7041/Y.1303, "Series G: Transmission Systems and Media, Digital Systems and Networks", Telecommunication Standardization Sector of ITU, Generic Framing Procedure (GFP), Oct. 2008, 79 pages, Geneva, Switzerland.
International Telecommunication Union, ITU-T G.7041/Y.1303, "Series G: Transmission Systems and Media, Digital Systems and Networks", Telecommunication Standardization Sector of ITU, Generic Framing Procedure, Apr. 2011, 82 pages, Geneva, Switzerland.

* cited by examiner

*Primary Examiner* — Phuongchau Ba Nguyen
(74) *Attorney, Agent, or Firm* — Dennis R. Haszko

(57) ABSTRACT

A self-synchronous scrambler/descrambler and method for operating same are disclosed. A self-synchronous scrambler/descrambler comprises an M-bit Scrambler State memory for retaining M previously scrambled/descrambled bits, a SOP/EOP Zero Inserter for receiving replacing certain bytes of the bus word with a value of zero, a Mid-Packet Word Logic for scrambling/descrambling the received bits using the previously scrambled/descrambled bits from the M-bit Scrambler State memory; and a Barrel Shifter for rotating the M-bit Scrambler State memory backwards. The method for scrambling/descrambling bits, comprising receiving a bus word, replacing certain bytes of the bus word, scrambling/descrambling bits of the bus word by exclusive-ORing with previously scrambled/descrambled bits, retaining the scrambled/descrambled bits of the bus word; and rotating the scrambled/descrambled bits of the bus word backwards an amount.

12 Claims, 6 Drawing Sheets

SELF-SYNCHRONOUS SCRAMBLER/DESCRAMBLER AND METHOD FOR OPERATING SAME

CROSS-REFERENCE TO RELATED APPLICATION

This application claims the benefit of U.S. Provisional Patent Application No. 61/695,849, entitled "WIDE BUS SELF-SYNCHRONOUS SCRAMBLER ENGINE" filed on Aug. 31, 2012, which is hereby incorporated by reference in its entirety.

FIELD

The present disclosure relates generally to the field of data communication protocols. More particularly, the present disclosure relates to the scrambling and descrambling of data carried in data communication protocols.

BACKGROUND

In recent years, the bandwidth demand on telecommunication networks has increased dramatically. Class protocols for 100 Gigabit/second (100 Gbps) networks have already been defined in IEEE Ethernet and in ITU-T Optical Transport Network standards. An example of such a protocol is the generic framing protocol (GFP). Four hundred Gigabits/second protocols and 1 Terabit/second (1 Tbps) protocols are expected to be defined in the near future. Although successive generations of CMOS technologies have been able to reduce the size of electronic processing elements allowing for dramatically more electronic elements (i.e. gates) per unit area, the speed of electronic processing elements in CMOS technologies has not significantly increased. Accordingly, as data rates increase, electronic processing elements must use wider internal datapaths or busses. Wider internal datapaths or busses allow for more data to be processed in parallel.

When transferring data over a network, the data is typically encapsulated as packets such as GFP frames. The frames are scrambled using a scrambler then concatenated together and transmitted. The transmitted packets are received, delineated back into packets or frames, placed on a bus W-bytes wide, and descrambled. A packet-based linecard is typically used to perform these functions.

FIG. 1 shows a typical packet-based linecard 100. On a receive side 102, serial Receive Data Rx, which is transmitted as a series of concatenated packets or frames, is converted by the SIPO (Serial In Parallel Out) 104 to parallel byte wide words of size W. For 100 Gbps streams, W is typically in the range of 32 to 64 bytes. For 1 Tbps streams, W is expected to be of the order of 512 bytes. The Frame Delineation 106 separates the Receive Data Rx into packets or frames and places them aligned to bus word boundaries of a receive packet bus 300, as shown in FIG. 3, within the Frame Delineation 106.

FIG. 2 shows an example packet of a GFP frame 200. The frame 200 has a Core Header 202 (4 bytes in length), a Type and Extension Header 204 of variable length between 4 and 64 bytes, a payload 206 of variable length, and a payload frame check sequence (FCS) (4 bytes in length) 208. The Core Header 202 includes a two byte payload length indicator (PLI) field and a two byte Core Header Error Control (cHEC) field that contains a cyclic-redundancy-check (CRC-16).

FIG. 3 shows an example frame 200 (as shown in FIG. 2) placed on a receive packet bus 300. The receive packet bus 300 comprises multiple, parallel, bus words 302 of W-byte lengths, and has at least a Start-of-Packet (SOP) Word 304, an End-of-Packet (EOP) Word 308, and potentially one or more Mid-Packet-Words 306 therebetween. The width W of the receive packet bus 300 and, accordingly the corresponding bus word 302 length W, can be any number of bytes. For 100 Gbps data rates, the receive packet bus 300 width W would likely be in the range of 32 bytes. For a 1 Tbps data rate, the receive packet bus 300 width W would likely be around 512 bytes. The Core Header 204 is aligned to the most significant byte of the SOP Word 304. Because a frame 200 is of variable length, the location of its last byte 310 can be at any position in the EOP Word 308 (as shown in FIG. 3) of the receive packet bus 300. All remaining bytes of a bus word 302, after the least significant bit of the last byte 310, are filled with null bytes.

Referring back to FIG. 1, once a frame 200 is delineated, it is sent to a Scrambler+FCS Engine 108 for de-scrambling and Payload FCS checking. Typically, the Scrambler+FCS Engine 108 is an $X^{43}+1$ self-synchronous scrambler/descrambler. For GFP frames, the self-synchronous scrambler/descrambler uses a generating polynomial of $G=x^{43}+1$. After higher layer protocol packet processing is performed by a Packet Processor 110, the frame 200 is written out to a FIFO 112.

FIG. 4 shows a logical bit-serial representation of a typical X43+1 self-synchronous scrambler/descrambler 400 (scrambler) defined in ITU-T G.7041. The scrambler 400 scrambles and descrambles bits in a data stream by using previously scrambled or descrambled bits, respectively. This helps ensure rich transition densities on serial optical transmission streams. As discussed below, the scrambler 400 is only a component of a larger electronic circuit for performing the scrambling and descrambling function in the packet-based linecard.

The scrambler 400 has an input 402, an XOR module 404, an output 406, and a series of 43 delay modules 408. In operation, the representative scrambler 400 receives data D(t) comprising a series of bits at its input 402. Each bit is exclusive-ORed by the XOR module 404 with a second bit from a 43rd delay module 408. The result of the exclusive-OR is sent to the output 406 and also saved to a 1st delay module 408. For each bit of data D(t) exclusive-ORed by the representative scrambler 400, the results stored in the delay modules 408 are advanced, one-by-one beginning at the 1st delay module 408 and proceeding to the 43rd delay module 408. The same scrambler 400, with the same number of delay modules 408 must be used on both the transmit side 114 and the receive side 102, as defined in FIG. 1.

On the transmit side 114, a bit stream is read from the FIFO 112 by the Packet Processor 110. The Packet Processor 110 performs higher layer packet processing on the bit stream and adds a Core Header 202, and optionally, a Type and Extension Header 204, thereto to create a packet or frame 200. At the output of the Packet Processor 110, the frame 200 is placed on a transmit packet bus. A transmit packet bus is essentially the same as the receive packet bus 300 as shown in FIG. 3. Payload FCS 208 is added and the frame 200 is scrambled by the Scrambler+FCS Engine 108 in a manner similar to that described above. Frames 200 are then concatenated together by the Frame Concatenation 116 and serialized for transmission by the PISO (Parallel In Serial Out) 118.

During operation, the scrambler 400 neither scrambles nor descrambles, nor uses for scrambling/descrambling, bits in the Core Header 202. Since the N NULL bytes beyond the payload FCS bytes are not part of the frame, they too are also not scrambled or descrambled or used for scrambling/descrambling. Accordingly, the state of the scrambler 400 at the end of the previous frame 200 is used as the initial condition at the beginning of the next frame 200. To accomplish this, the scrambler 400 stops scrambling or descrambling at the last byte 310 of a frame payload FCS 208 of a frame 200, and restarts scrambling or descrambling at the first byte of the Type Header 204 of the next frame 200. Known solutions use a brute-force approach consisting of a set of W+1 partial scramblers and a controller to accomplish this.

FIG. 5 shows a brute-force scrambler/descrambler (scrambler) 500 as known in the art. The scrambler 500 uses W+1 partial scramblers/descramblers 502. The partial scramblers/descramblers 502 are similar to the scrambler 400 of FIG. 4. A total of W−1 of the partial scramblers/descramblers 502 accommodate the W−1 possible byte positions of the last byte 310 in the receive packet bus 300. Each partial descrambler is configured to handle a unique last byte 310 location from position 1 of the bus word 302 to position W of the bus word 302. An additional 2 partial scramblers/descramblers 502 are used for the cases where the bus word 302 contains the Core Header 202, and where the bus word is filled entirely with the payload 206. A 43-bit scrambler state 506 with memory, and a W+1 to 1 MUX 504 select which of the W+1 partial scramblers/descramblers 502 are used for each bit of an incoming data stream. The memory of the 43-bit scrambler state 506 can be a series of 43 delay modules. The use of 32+1 partial scramblers/descramblers 502 is trivial in a W=32 byte wide packet bus. A packet bus of W=512 bytes, however, would require 512+1 partial scramblers/descramblers 502.

It is, therefore, desirable to have a scrambler/descrambler which does not require W+1 partial scramblers/descramblers.

BRIEF DESCRIPTION OF THE DRAWINGS

Embodiments of the present disclosure will now be described, by way of example only, with reference to the attached Figures.

DETAILED DESCRIPTION

This specification describes a self-synchronous scrambler/descrambler and method for operating same.

The self-synchronous scrambler/descrambler comprises an M-bit Scrambler State memory for retaining M previously scrambled/descrambled bits; a SOP/EOP Zero Inserter for receiving a bus word of a frame, and for replacing all bytes of the bus word which are excluded from scrambling/descrambling with a value of zero; a Mid-Packet Word Logic, in communication with the SOP/EOP Inserter and the M-bit Scrambler State memory, for receiving bits from the SOP/EOP Zero Inserter, and scrambling/descrambling the received bits using the previously scrambled/descrambled bits from the M-bit Scrambler State memory; and a Barrel Shifter, in communication with the Mid-Packet Word Logic and the M-bit Scrambler State memory, for rotating the M-bit Scrambler State memory backwards an amount equal to (N×8) modulo M bits, where N is the number of bytes of the bus word which were replaced with the value of zero by the SOP/EOP Zero Inserter.

In an embodiment, the bus word is a SOP Word. In another embodiment, the bytes excluded from scrambling/descrambling are Core Header bytes. In another embodiment, the bus word is an EOP Word. In another embodiment, the bytes of the bus words excluded from scrambling/descrambling are a remainder of bytes in the bus word after a last byte of a payload FCS 208 the frame. In another embodiment, the bytes of the bus words excluded from scrambling/descrambling are a remainder of bytes of the bus word after a last byte 310 of a payload FCS 208, and Core Header bytes of a next frame at the head of the next bus word.

The method comprises receiving a bus word of a frame; replacing bytes of the bus word which are excluded from scrambling/descrambling with a value of zero; scrambling/descrambling bits of the bus word by exclusive-ORing with previously scrambled/descrambled bits; retaining the scrambled/descrambled bits of the bus word; and rotating the scrambled/descrambled bits of the bus word backwards/right an amount equal to (N×8) modulo WM bits, where N is the number of bytes of the bus word which were replaced with the value of zero.

In another embodiment, the bus word is a SOP Word. In another embodiment, the bytes of the bus word excluded from scrambling/descrambling are Core Header bytes. In another embodiment, the bus word is an EOP Word. In another embodiment, the bytes of the bus word excluded from scrambling/descrambling are a remainder of bytes in the bus word after a last byte of a payload FCS 208. In another embodiment, the bytes of the bus word excluded from scrambling/descrambling are a remainder of bytes in the bus word after a last byte of a payload FCS 208, and bytes of a Core Header of a next frame.

Other aspects and features of the present disclosure will become apparent to those ordinarily skilled in the art upon review of the following description of specific embodiments in conjunction with the accompanying figures.

Figure 1:
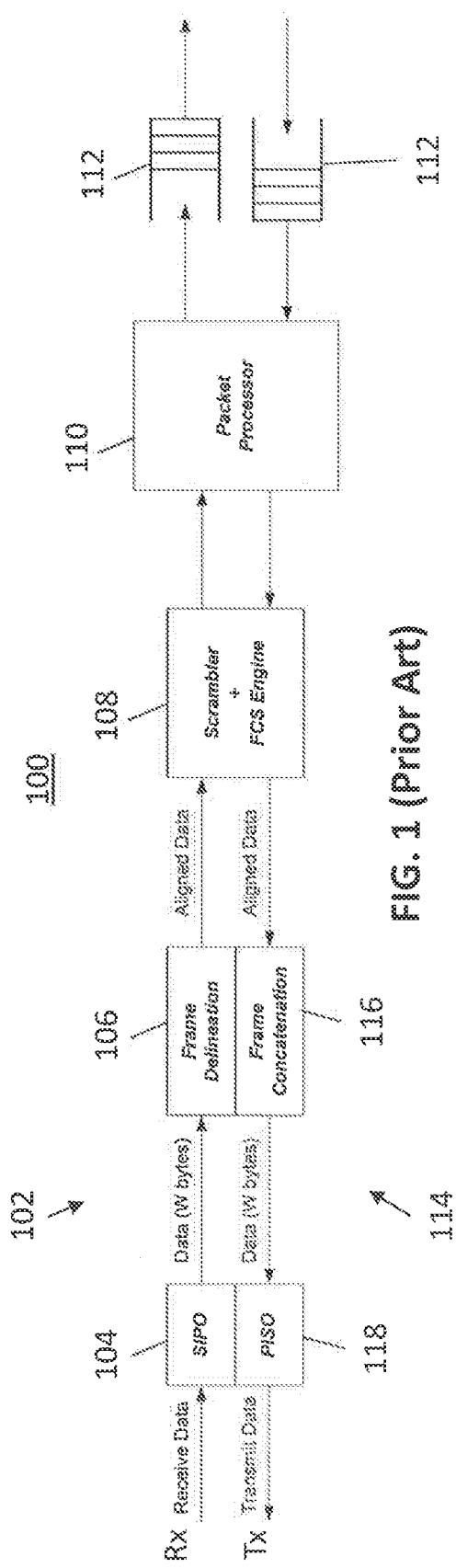
FIG. 1 shows a packet-based line card.
Figure 2:
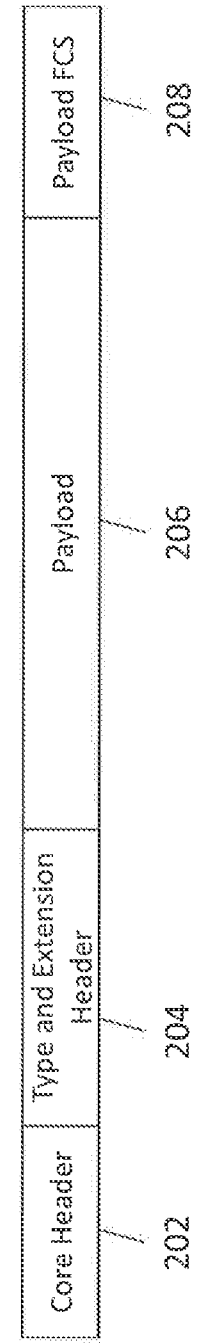
FIG. 2 shows a GFP frame.
Figure 3:
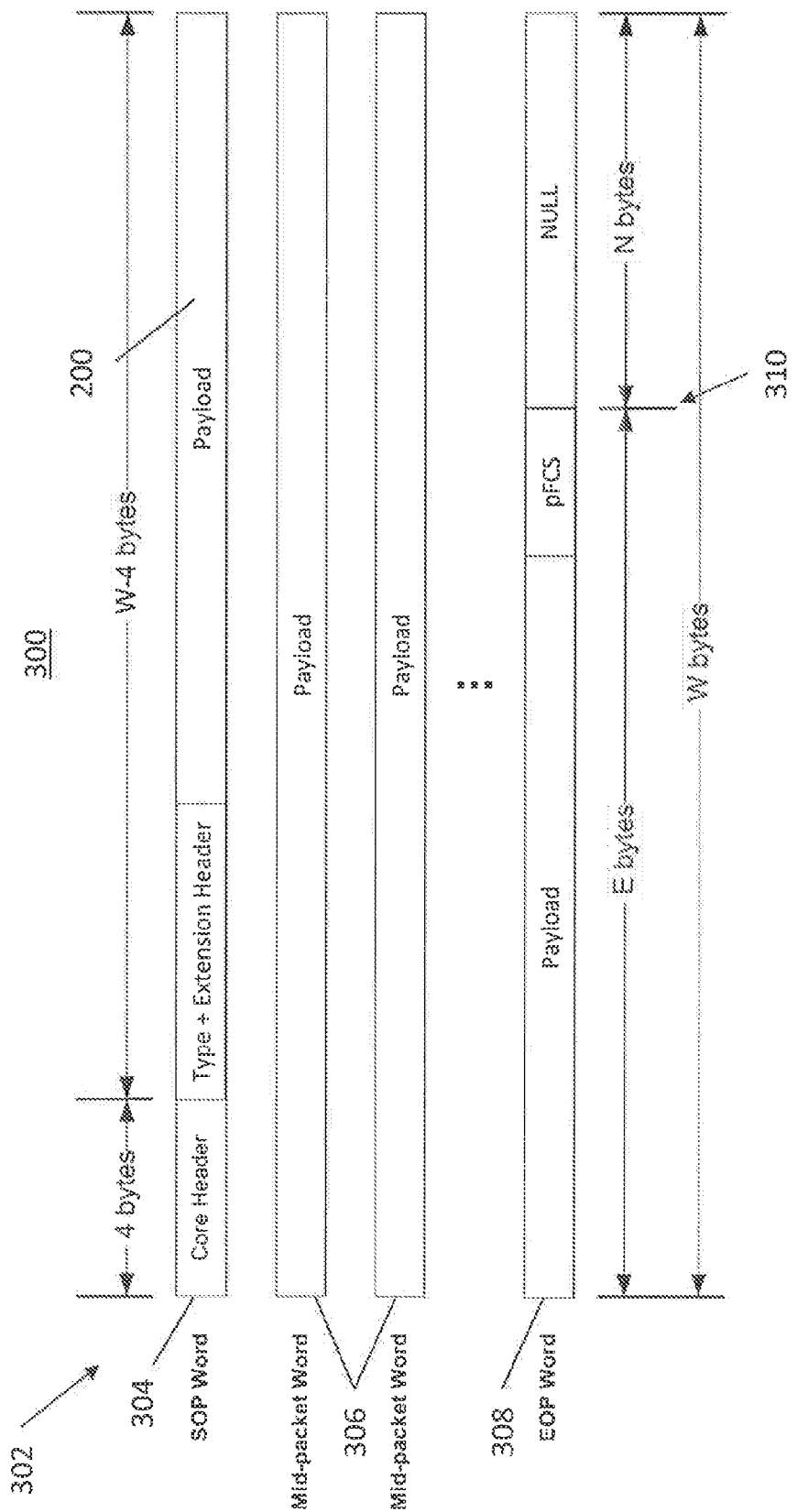
FIG. 3 shows the GFP frame of FIG. 2 on a receive packet bus.
Figure 4:
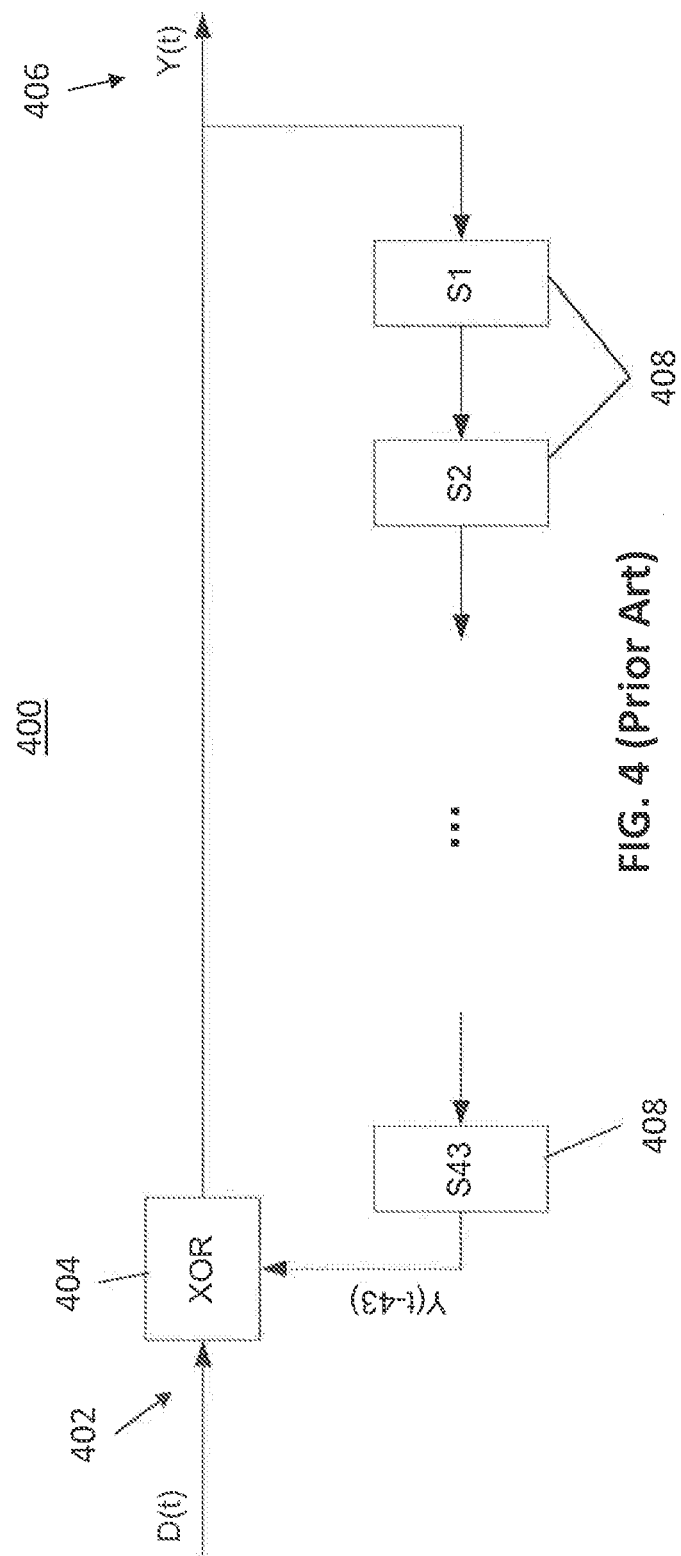
FIG. 4 shows a bit-serial representation of a self-synchronous scrambler/descrambler.
Figure 5:
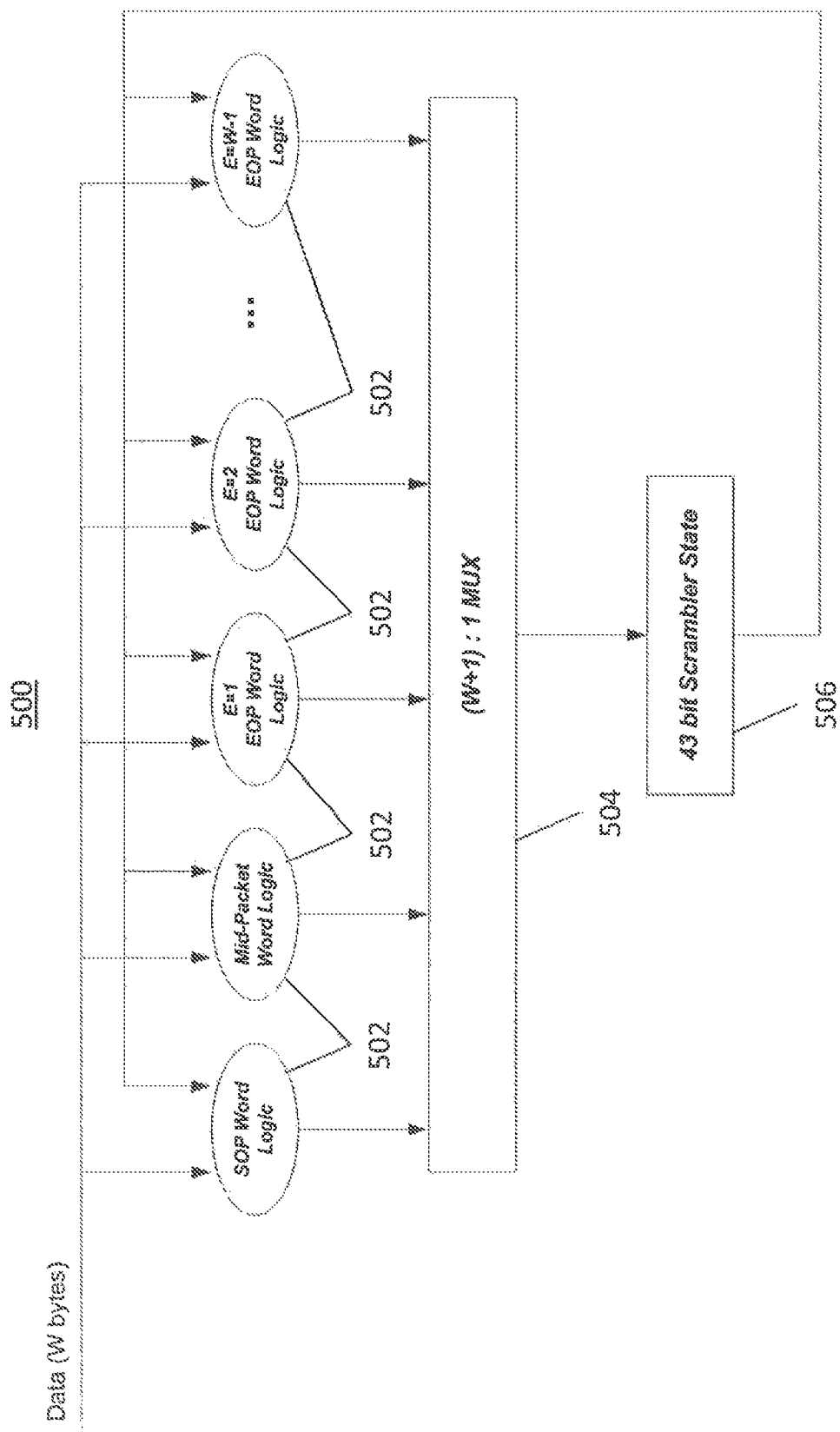
FIG. 5 shows self-synchronous scrambler as known in the art.
Figure 6:
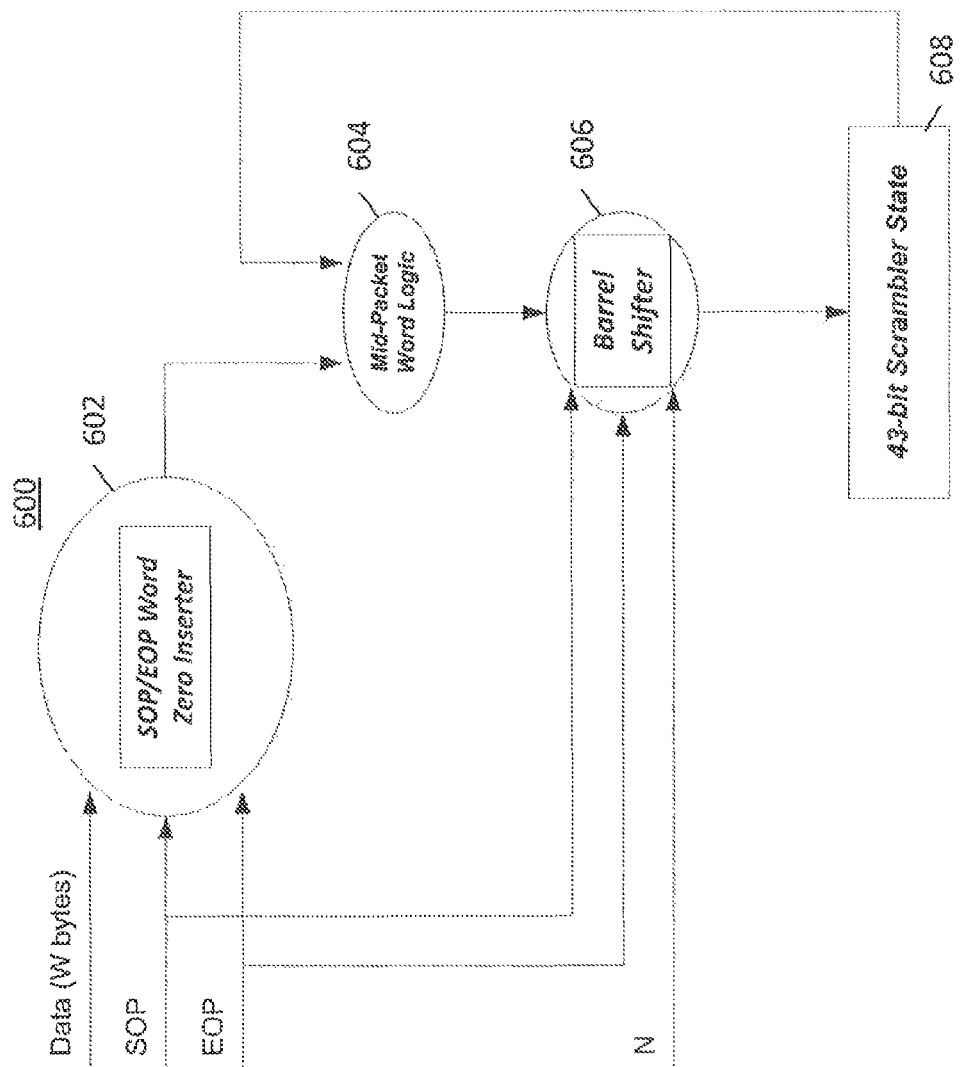
FIG. 6 shows a self-synchronous scrambler/descrambler according to an embodiment of the present disclosure.

FIG. 6 shows a self-synchronous scrambler/descrambler 600 (scrambler) according to an embodiment of the present disclosure. The scrambler 600 comprises a SOP/EOP Word Zero Inserter 602, a Mid-Packet Word Logic 604, a Barrel Shifter 606, and a 43-bit Scrambler State 608 (Scrambler State). The 43-bit Scrambler State comprises a memory of 43 delay modules arranged in series for storing scrambled or descrambled bits. The Mid-Packet Word Logic 604 is similar to the scrambler 400 as shown in FIG. 4.

When descrambling, the SOP/EOP Word Zero Inserter 602 receives one word of a frame 200 at a time. The frame 200 has already been aligned to the receive packet bus 300. If either a SOP Word 304 or an EOP Word 308 is received by the SOP/EOP Word Zero Inserter 602, a signal is also received indicating same.

In the case of receiving an SOP Word 304, the word is shifted forward by 4 bytes to remove the Core Header 202. The least significant bytes of the SOP Word 304, corresponding to the amount of shift, are replaced with zeros.

In the case of receiving an EOP Word 308, the position of the last byte 310 is determined. The remainder of the word after the last byte 310 is replaced with zeros.

The SOP/EOP Word Zero Inserter 602 outputs each bus word 302 to the Mid-Packet Word Logic 604. The Mid-Packet Word Logic 604 descrambles the entire bus word 302, including any bytes which were replaced with zeros. The Mid-Packet Word Logic 604 is agnostic to whether the bus word 302 is an SOP Word 304, a Mid-packet Word 304, or an EOP Word 308. The descrambled/scrambled bus word 302 is sent by the Mid-Packet Word Logic 604 to the Packet Processor 110 or the Frame Concatenation 116. The descrambled/scrambled bus word 302 is also sent by the Mid-Packet Word Logic 604 to the Barrel Shifter 606 one bit at a time.

The Barrel Shifter 606 receives the bits of the descrambled/scrambled bus word 302, signals indicating whether the bus word 302 bit is from an SOP Word 304 or an EOP Word 308, and the number of least significant bytes (N) after the last byte 310 if it is an EOP Word 308. The Barrel Shifter 606 sequentially stores each bit of the descrambled/scrambled bus word 302 to the 43-bit Scrambler State 506. In the case of an SOP Word 304, the Barrel Shifter 606 compensates for the left-shift of the SOP Word 304 by rotating the 43-bit Scrambler State 608 backwards by 4×8 modulo M bits where M=43 to compensate for the 4 bytes of padding inserted to account for the discarded Core Header 202. In the case of an EOP Word 308, the Barrel Shifter 606 compensates by rotating the Scrambler State 608 backwards by (N*8) modulo M bits, where M=43. No rotation is performed for mid-packet words. Rotating the 43-bit Scrambler State 608 backwards means, for example, that the value in the 2nd delay module 408 is moved to the first delay module 408, the value in the first delay module is moved to the 43rd delay module, and the value in the 43rd delay module is moved to the 42nd delay module, etc.

Rotating the Scrambler State 608 backwards for SOP Words 302 and EOP Words 308, as described, essentially returns the delay modules 408 to the state they would have been in if they had not been used to descramble the replaced bits. Rotating the Scrambler State backwards is all that is required to reestablish a correct state. This is because exclusive-ORing the contents of the 43rd delay module 408 with 0 results in whatever value the 43rd delay module 408 contained at that time. As shown in FIG. 4, this result is then saved to 1st delay module 408. In other words, when the incoming data bit is a zero (replaced bit), the next state of the 43-bit Scrambler State is the current state rotated forward by one position. After a string of K zero bits, the scrambler state 606 is the current state rotated forward by (K modulo 43) positions. Thus, it is possible to undo the effects of scrambling/descrambling K bits of zeros, and recover the scrambler state 606 by rotating the Scrambler State 608 backwards by K modulo 43 bits. Since every 43 rotational steps of the Scrambler State 408 returns it to the original position, a K modulo 43 step rotation is equivalent to a K step rotation. This is especially useful when the size of the bus word 302 is large.

In a further embodiment of the present disclosure, the scrambler 600 is extended to protocols where a disjoint or non-contiguous set of P bytes within each bus word 302 are excluded from scrambling/descrambling. In those cases, the SOP/EOP Word Zero Inserter 602 concatenates all of the bytes that do participate in scrambling/descrambling to the W to P most significant bytes of the data bus of each bus word 302. The SOP/EOP Word Zero Inserter 602 then inserts zeros for each byte of the P least significant byte of each bus word 302. The distribution and number of bytes excluded from scrambling/descrambling may be different for each bus word 302. The Barrel Shifter 606 rotates the output from the Mid-Packet Logic 604 backward by (P*8) modulo 43 bit positions.

In a still further embodiment of the present disclosure, the self-synchronous scrambler 600 is extended to protocols where the scrambler polynomial is given by $G=x^M+1$, where M is the number of delay modules 408. In this embodiment, the Barrel Shifter 606 uses modulo 'M' arithmetic instead of modulo 43 in calculating the amount by which to rotate the Scrambler State 608.

Figure 7:
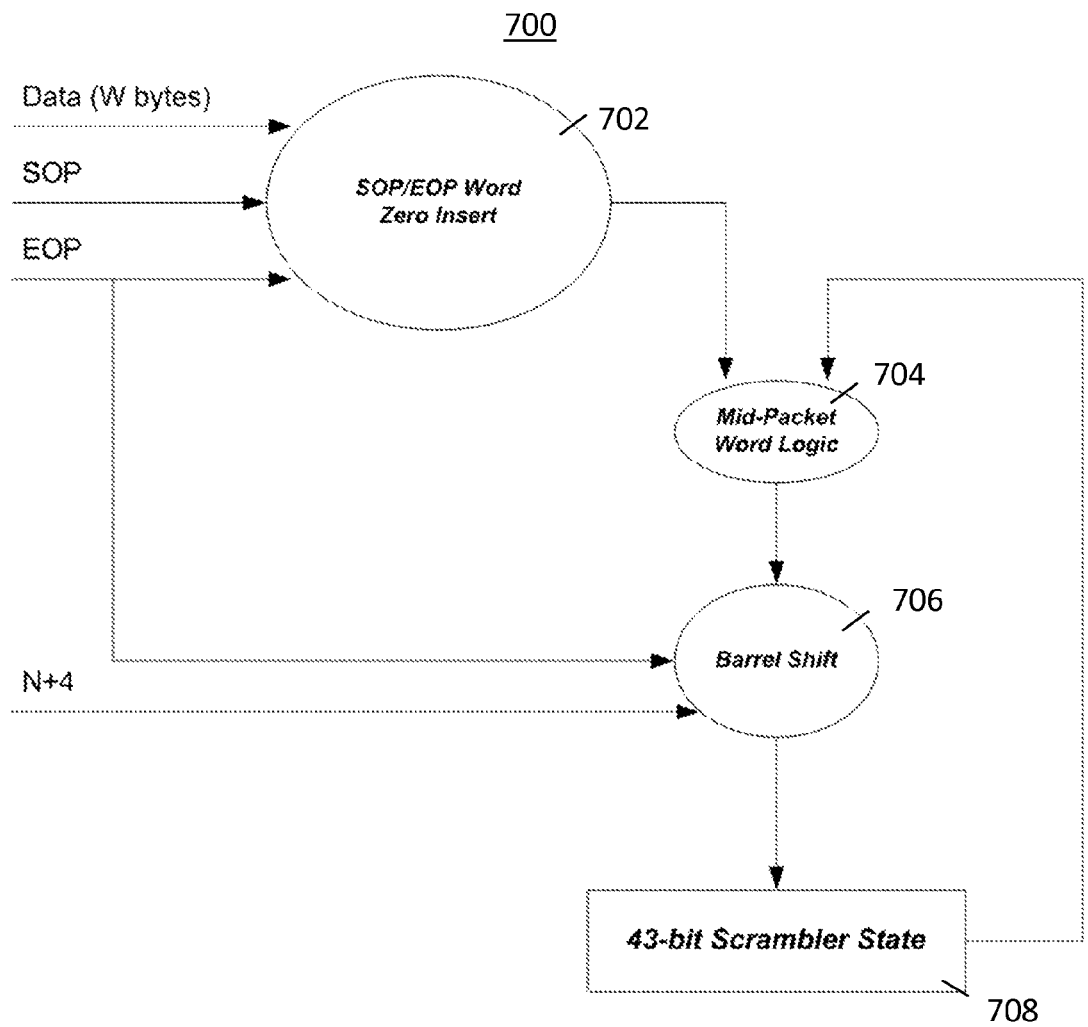
FIG. 7 shows a self-synchronous scrambler/descrambler according to an alternate embodiment of the present disclosure.

FIG. 7 shows another embodiment of a self-synchronous scrambler/descrambler 700 (scrambler) according to the present disclosure. The scrambler 700 is similar to the scrambler 600 of FIG. 6, except that the Barrel Shifter 706 does not receive a signal that a word is an SOP Word 304, and receives a signal of N+H bytes rather than only N bytes. In this way, the self-synchronous scrambler 700 combines the two steps of recovering a state of an EOP Word 308 of one frame 200, and a state of a SOP Word 304 of the next frame 200 into one step. This is possible because, when processing an EOP Word 308, it is only necessary to return a Scrambler State 708 to the first byte beyond the four Core Header 202 bytes of the next GFP frame 200.

When the EOP Word 308 is being processed by the SOP/EOP Word Zero Inserter 702, it replaces the least significant N bytes of the word, beginning after the last byte 310, with zeros. No shifting is performed. When the SOP Word 204 is being processed by the SOP/EOP Word Zero Inserter 702, it replaces the H=4 Core Header bytes 202 with zeros. The Mid-Packet Word Logic 704 computes the Scrambler State 708 based on its current state and the W bytes of output from the SOP/EOP Word Zero Inserter 702. Again, the Mid-Packet Word Logic 704 is agnostic to whether the incoming bus word 302 is an SOP Word 304, a Mid-packet Word 306, or an EOP Word 308. The Barrel Shifter 706, upon receiving an EOP signal, proceeds to rotate the 43-bit Scrambler State 708 backwards by ((N+H×8) modulo 43 bit positions at the EOP Word 308. No rotation is performed for SOP Words 304 or Mid-packet Words 306.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A self-synchronous scrambler/descrambler, comprising an M-bit Scrambler State memory for retaining M previously scrambled/descrambled bits;
a SOP/EOP Zero Inserter for receiving a bus word of a frame, and for replacing all bytes of the bus word which are excluded from scrambling/descrambling with a value of zero;
a Mid-Packet Word Logic, in communication with the SOP/EOP Inserter and the M-bit Scrambler State memory, for receiving bits from the SOP/EOP Zero Inserter, and scrambling/descrambling the received bits using the previously scrambled/descrambled bits from the M-bit Scrambler State memory; and
a Barrel Shifter, in communication with the Mid-Packet Word Logic and the M-bit Scrambler State memory, for rotating the M-bit Scrambler State memory backwards an amount equal to (N×8) modulo M bits, where N is the number of bytes of the bus word which were replaced with the value of zero by the SOP/EOP Zero Inserter.

2. The self-synchronous scrambler of claim 1, wherein the bus word is a SOP Word.

3. The self-synchronous scrambler of claim 2, wherein the bytes of the bus word excluded from scrambling/descrambling are the Core Header bytes.

4. The self-synchronous scrambler of claim 1, wherein the bus word is an EOP Word.

5. The self-synchronous scrambler of claim 1, wherein the bytes of the bus word excluded from scrambling/descrambling are a remainder of bytes of the bus word after a last byte of a payload frame check sequence, and the Core Header bytes of a next frame.

6. A method for scrambling/descrambling bits, comprising receiving a bus word of a frame in a SOP/EOP Zero Inserter;
replacing, with the SOP/EOP Zero Inserter, bytes of the bus word which are excluded from scrambling/descrambling with a value of zero;
scrambling/descrambling bits of the bus word with a Mid-Packet Word Logic by exclusive-ORing with previously scrambled/descrambled bits from an M-Bit Scrambler State memory;
retaining the scrambled/descrambled bits of the bus word in the M-Bit Scrambler State memory; and
rotating the scrambled/descrambled bits of the bus word backwards an amount equal to (N×8) modulo M bits, where N is the number of bytes of the bus word which were replaced with the value of zero.

7. The method of claim 6, wherein the bus word is a SOP Word.

8. The method claim 7, wherein the bytes of the bus word excluded from scrambling/descrambling are a remainder of bytes in the bus word after the last bytes of a payload frame check sequence.

9. The method of claim 7, wherein the bytes of the bus word excluded from scrambling/descrambling are a remainder of bytes of the bus word after the last bytes of a payload frame check sequence, and the Core Header bytes of a next frame.

10. The method of claim 6, wherein the bus word is an EOP Word.

11. The method of claim 10, wherein the bytes of the bus word excluded from scrambling/descrambling are a remainder of bytes in the bus word after a last byte of a payload frame check sequence.

12. The method of claim 10, wherein the bytes of the bus word excluded from scrambling/descrambling are the Core Header bytes.

* * * * *